UNITED STATES PATENT OFFICE.

DAVID H. CHAMBERS, OF PITTSBURG, PENNSYLVANIA.

METHOD OF REFINING KAOLIN, &c.

SPECIFICATION forming part of Letters Patent No. 543,292, dated July 23, 1895.

Application filed October 22, 1894. Serial No. 526,661. (No specimens.)

*To all whom it may concern:*

Be it known that I, DAVID H. CHAMBERS, of Pittsburg, in the county of Allegheny and State of Pennsylvania, have invented a new and useful Improvement in Methods of Refining Kaolin and other Earths, of which the following is a full, clear, and exact description.

My invention relates to the refining or separation from kaolin, ocher, or similar earths of the gritty or other deleterious constituents contained therein, and is designed to attain a cheaper, more expeditious, and more effective method than those heretofore employed.

The common method of separation previously used consisted in mixing the kaolin up with water and allowing the gritty matter to settle—an expensive, slow, and inefficient method, in which the impurities were not thoroughly separated.

In carrying out my invention in its preferred form, I first dry the earth, at least partially, either by air-drying or other means. I then disintegrate the earth by the use of any well-known disintegrator, such as the double-cylinder machine, in which, however, the gritty particles are not ground up, but are merely separated from the earth, which is reduced to a powdered condition therein. I then take the resulting powder and pass it through a combined heater and drier, preferably a steam-jacketed cylinder, in which the powder is not only dried, but heated, so that it will not absorb moisture on its way to the screens. From the heater and drier I pass the powder to a "scalper," which consists of a rotating cylindrical screen, through which the earth and fine gritty particles pass, while the larger particles of deleterious matters are left therein. From this scalper the powder passes to the sieves, which in the case of kaolin are preferably of very fine bolting-cloth of such fine mesh that the earth will not pass therethrough unless it is perfectly dry.

The heating forms an essential part of the process, as the powder, which is a great absorber of moisture, is thereby prevented from absorbing moisture before it reaches the bolting-cloth, through which it would not pass unless perfectly dry, and the earth may be heated before the disintegrating operation for this purpose, if desired the earth being made up into bricks and dried before disintegrating. The earth may also be separated from the heavier deleterious particles by directing a blast of air upon it and collecting the earth by a dust-collector. In either case, if thoroughly dried, a complete separation will be effected, the larger and heavier particles of gritty and other deleterious matters being entirely removed. With the use of bolting-cloth it is also found that the surface clays, which seep down and intermingle with and discolor the kaolin, are also removed.

I claim—

1. The method of refining kaolin and similar earths, consisting in disintegrating and drying the same, heating them to prevent their absorbing moisture, and then separating the larger particles of silica and other impurities from the powder; substantially as described.

2. The method of refining kaolin and similar earths, consisting in disintegrating and drying the same, passing them through a heater and drier, and then screening to remove the larger particles of silica and other impurities, substantially as described.

In testimony whereof I have hereunto set my hand.

DAVID H. CHAMBERS.

Witnesses:
W. B. CORWIN,
C. BYRNES.